Sept. 24, 1946.                    H. G. BUSIGNIES                    2,408,046
                        DISTORTING DIRECTION FINDER RECEIVER
                         Filed March 6, 1941            2 Sheets-Sheet 1
FIG.1.                    FIG.2.
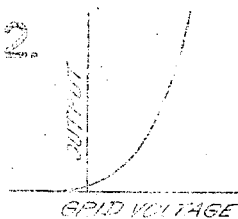
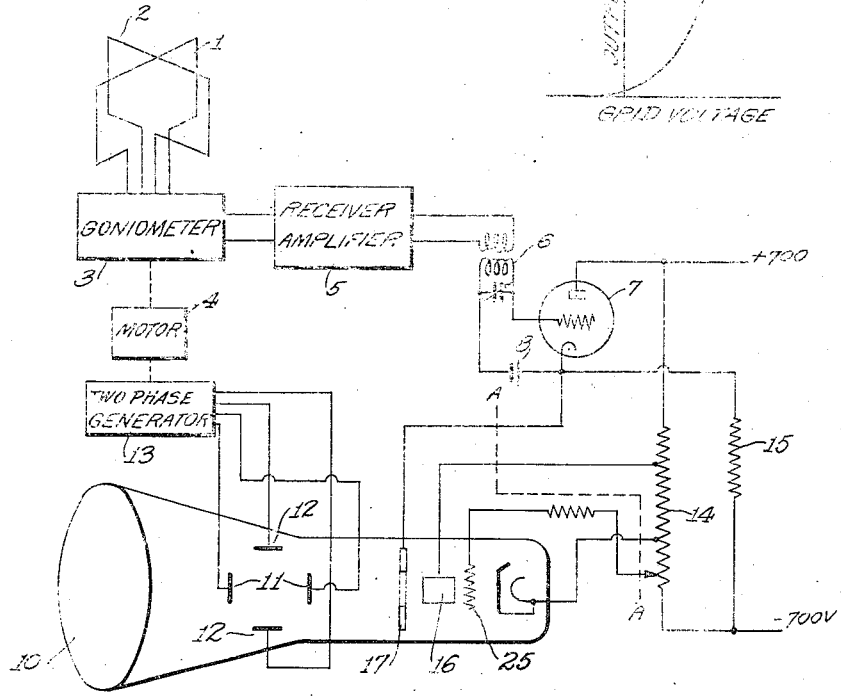
FIG.3.                    FIG.4.
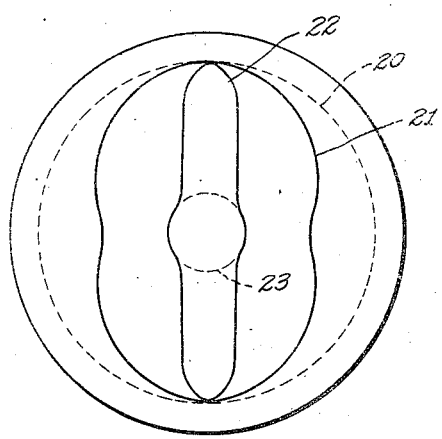   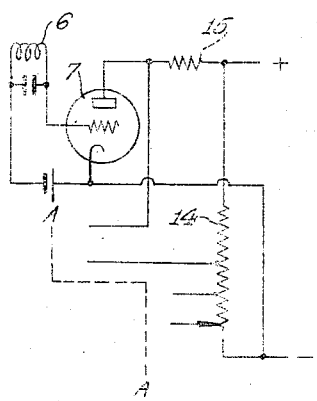
INVENTOR.
HENRI G. BUSIGNIES
BY
ATTORNEY.

Sept. 24, 1946.    H. G. BUSIGNIES    2,408,048
DISTORTING DIRECTION FINDER RECEIVER
Filed March 6, 1941    2 Sheets-Sheet 2
FIG.5.
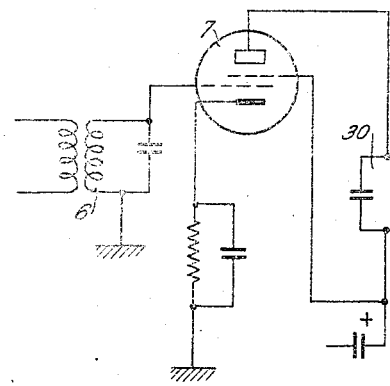
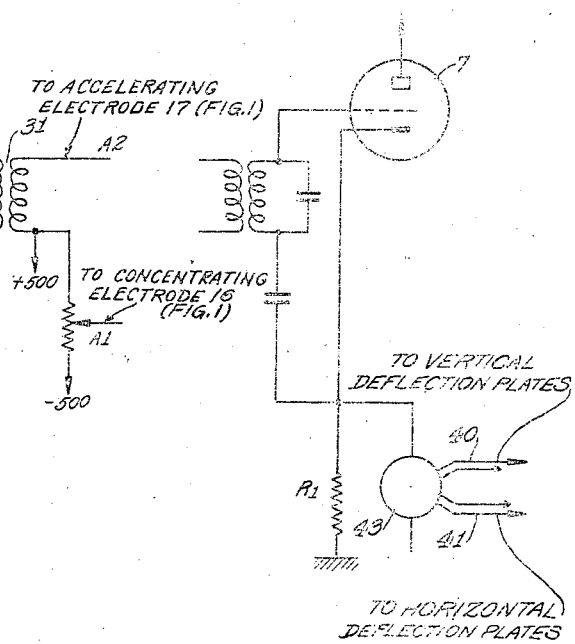
FIG.7.
FIG.6.
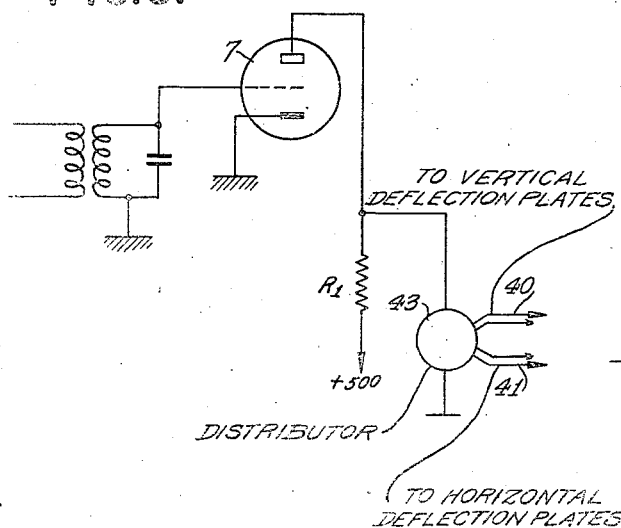
FIG.8.
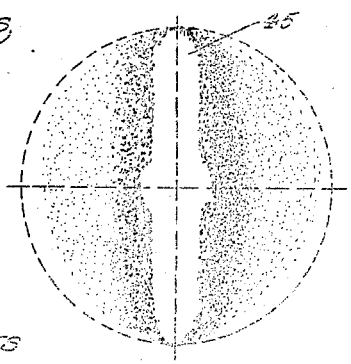
INVENTOR
HENRI G. BUSIGNIES
BY
ATTORNEY Patented Sept. 24, 1946

2,408,040

UNITED STATES PATENT OFFICE 2,408,040

DISTORTING DIRECTION FINDER RECEIVER

Henri G. Busignies, Forest Hills, N. Y., assignor to International Standard Electric Corporation, New York, N. Y., a corporation of Delaware Application March 6, 1941, Serial No. 381,936

4 Claims. (Cl. 250—11)

This invention relates to direction finders using a cathode ray indicator with lateral directional deviations, and more particularly to improved receiving arrangements for such systems giving a sharpened directional indication.

A number of direction finder receivers using cathode ray indicators have been proposed. In these systems a rotatable directional antenna or a system using a goniometer is used for receiving the signals so that an effective envelope depending upon the frequency of rotation of the system is produced. This envelope is then applied to a cathode ray tube to produce the desired deflection of the beam in a radial direction so that an indication of direction is obtained. This deflection may be achieved by directly applying the signal envelope to the deflecting plates of the tube or may be made by controlling the velocity of the beam to produce lateral deflection.

According to my invention the directional indication produced in such radial deviation arrangements is improved by the use of a receiver which has a large change in output for small changes in input. Accordingly, the output wave will be greatly strengthened in the directional indicating portions thereof so that a much sharper and more easily read indication is produced on the screen of the cathode ray tube. This invention is applicable to various types of indicators having radial deviation regardless of the particular system to which it is applied.

While I have outlined briefly above the principal object of my invention, a better understanding of my invention and the various objects and features thereof will be had from the particular description of specific embodiments thereof made with reference to the accompanying drawings, in which Fig. 1 diagrammatically illustrates a direction finder incorporating the receiving arrangement of my invention;

Fig. 2 is a curve showing the preferred characteristic for the detector tube used in a receiver according to my invention;

Fig. 3 is a diagrammatic illustration of a cathode ray screen showing the types of indications which may be produced in accordance with my invention;

Fig. 4 is a modified output arrangement to be used in the circuit of Fig. 1 in place of a part thereof;

Fig. 5 is an alternate circuit arrangement for the receiver whereby the extremely high voltages across the tube may be avoided.

Figs. 6 and 7 are modifications of my invention showing an output circuit applicable directly to the deflection plate of the cathode ray indicator; and Fig. 8 is a diagrammatic view of a cathode ray screen showing the indications produced in accordance with a feature of my invention.

In Fig. 1, 1 and 2 represent crossed receiving antennae which may be loops as shown, or dipoles of an Adcock array, or any other desired type of receiving antennae. These antennae are coupled to a goniometer 3 which is driven by motor 4. The signals with the modulated envelope caused by goniometer rotation are applied to receiver amplifier 5 which may be of any desired type and preferably is of the heterodyne type having a constant intermediate frequency so that it can be used over a very wide frequency range. Furthermore, if desired, the output of receiver 5 may be in the form of inverted modulation signals so that constant amplitude peaks will be produced regardless of the signal strength.

The output envelope from receiver 5 is applied over a tuned circuit 6 to a vacuum tube detector 7. Tube 7 is biased by a battery 8 and preferably has a characteristic such as shown in Fig. 2. The output increases very rapidly for small amounts of grid voltage change. It is, therefore, clear that the output of tube 7 will have a decided peak at the amplitude peaks of the input signal, considerably higher than would be obtained in ordinary straight line amplification.

A cathode ray indicator 10 is provided having horizontal and vertical deflection plates 11 and 12, respectively. The deflection plates are energized by the output of a two-phase generator 13 driven in proper timed relation with goniometer 3 by means of motor 4. The cathode of the cathode ray tube is connected to a suitable point on a resistance 14 connected across a high voltage source. The grid 25 of the cathode ray tube is connected so as to be biased somewhat negatively, and the concentrating anode 16 is connected to a desired intermediate point on resistance 14. The accelerating electrode 17 is coupled to a point on the cathode of tube 7 and the cathode is further connected over a resistance 15 to the negative side of the high potential source across which 14 is connected.

The tube circuit of tube 7 is so arranged that the internal resistance of the tube taken with resistance 15 forms a potential divider across the high potential source. When tube 7 is completely blocked this tube constitutes the major part of the resistance in this potential dividing circuit, resistance 15 may, for example, be made substantially a megohm. Upon application of signals to tube 7 sufficient to render the tube conductive the resistance of this element drops sharply. Accordingly, a large potential change is applied to accelerating electrode 17, causing the velocity of the beam to be altered and thus producing a radial deflection.

Turning now to Fig. 3, the cathode ray tube may have a normal circle of rotation indicated at 20. When no signal deflections are present the cathode ray beam will follow this circle. However, upon application of deflecting potentials to electrode 17, the beam will be caused to trace an image such as shown at 21. If no distortion is present in the receiver output, the trace will be broad, as shown in 21, and it is, therefore, difficult to accurately read the indication. By using the arrangement in accordance with my invention, the output amplitudes are sharply varied, and a narrower pattern 22 is traced on the screen of the cathode ray tube. The inner point of deflection of the tube is defined by the dotted circle 23 of Fig. 3. Consequently, the narrow figure 22 will have a bulge at the center, the radius of which depends upon the saturation point of the cathode ray tube.

While I have shown a mechanically rotatable goniometer and two-phased generator, in Fig. 1, it is clear that if desired any type of rotation such as the electronic rotation covered in my co-pending application Ser. No. 381,840, filed March 5, 1941, entitled "Electronic rotation direction finder" may be used. Furthermore, if the receiver 5 is of the inverted modulation type, patterns 21 and 22 will come to a direct point on the cathode ray indicator and will further enhance the reading of the indicator.

Instead of connecting resistance 15 across the circuit between the cathode and the negative side of the high potential source, the resistance may be connected between the anode of tube 7 and the positive side of the high potential source, as shown in Fig. 4. In this case the connection to accelerating electrode 17 is made from a point intermediate the anode of tube 7 and resistance 15. With this arrangement the cathode ray will normally trace the smaller circle shown at 23 and the deflection caused by application of signals to accelerating electrode 17 will be such as to produce outward radial deviation of the beam. In either of these systems a reversal in the direction of deflection may be made by adding a single phase reversing stage between the output of tube 7 and the connection point to the accelerating electrode.

Instead of producing an outline trace of the pattern on the screen of the cathode ray tube, the entire modulated signal including carrier frequency may be applied producing a solid figure indication. When this is done receiver amplifier 5 either serves merely as a straight amplifier or produces an output signal modulated with a fixed intermediate carrier. The output signals applied to 17 then produce complete modulation so that the entire area enclosed within pattern 22, for example, is bright or the entire surface of the tube except for this portion enclosed within the curve is bright.

If the tube such as 7 is not built to withstand the high potentials applied in the arrangement to Fig. 1, a modified circuit such as shown in Fig. 5, may be used. In this arrangement the output of tube 7 is coupled to a tuned circuit 30 which is coupled by means of a transformer 31 to the high potential source. Lead A2 may then be applied to the accelerating electrode 17 and lead A1 to the concentrating electrode 16.

If it is desired to secure the advantages of my invention when applied to an arrangement using the deflecting electrodes for causing the radial deflection, the circuit arrangement of Figs. 6 and 7 may be used. In Fig. 6, tube 7 is arranged with an output resistance R1 in the anode circuit. The drop in resistance R1 is then applied to a rotatable distributor which is preferably formed of a resistance ring around which brushes are caused to rotate in timed relation with the antenna rotation, and the output of this distributor is then applied by leads 40 to plate 12 and by leads 41 to plate 11 of the cathode ray tube. Tube 7 of Fig. 6, has the same general characteristics as the tube 7 of Figs. 1 to 5. The resistance distributor is preferably used since this type of distributor will not destroy any sharp peaks which may be present in the indicating signal and thus will permit the obtaining of a sharper directional indication.

Fig. 7 is similar to Fig. 6, except that resistance R1 is connected between the cathode of tube 7 and ground and the input to the distributor 43 is, therefore, such that the deflection will be in the opposite direction from that of the system shown in Fig. 6.

Fig. 8 discloses a typical cathode ray screen arrangement using the principles of my invention. The white portion 45 of this figure indicates the cathode ray directional indication and is as shown, dark. The remaining portion of the screen is illuminated and because of the peculiar characteristics of the output receiver the beam moved slower at the part of the screen adjacent the pattern than at the outside rim of the tube, so that the curve 45 is outlined in more brilliant light than are the edges of the screen. It is clear that if the opposite direction of displacement is used, area 45 will be bright and the remaining portions of the screen will then be dark.

In accordance with my invention it is clear that greatly sharpened indications will be produced which may be easily and accurately read. Furthermore, my invention is applicable to any of the various types of cathode ray indicators utilizing radial deflection for directional indication. The description offered above is not to be considered a limitation on the scope of my invention but merely is presented to give a complete description so that the invention may be fully understood.

What is claimed is:

1. A direction finder comprising means for producing an effective rotation of a directive receiving antenna to produce a wave pattern envelope dependent upon the speed of rotation, a cathode ray indicator comprising means for producing an electron beam, means for rotating said beam in predetermined time relation with the effective rotation of said antenna, means for applying signals of said envelope to said indicator during substantially the entire time of each rotation of said beam to produce radial displacement of the electron beam during rotation, and means for accelerating said radial displacement with envelope amplitude changes, comprising an electron tube having a sharply rising output with change in input voltage, said tube being conductive for substantially all values of input voltage, means for coupling said effectively rotated antenna to the input of said tube, and coupling means for coupling the output of said tube to said indicator to produce said radial displacement.

2. A direction finder according to claim 1, wherein said last named means comprises connections to said indicator to produce outward radial displacement of said beam in response to increased output of said tube.

3. A direction finder according to claim 1, wherein said indicator comprises a cathode ray tube having sets of deflector plates, and an accelerating electrode, said rotating means comprises means for energizing said deflector plates to cause a normal rotary movement of said beam, and in which said coupling means apply said electron tube output to said accelerating electrode to produce said radial displacement by velocity modulation of said beam.

4. A direction finder according to claim 1, wherein said indicator comprises two sets of deflector plates, and said coupling means comprises a distributor coupled in the output of said tube and means for applying the output of said distributor to said deflecting plates to cause simultaneous rotary movement and radial displacement of said beam.

HENRI G. BUSIGNIES.